March 15, 1955  H. R. FREUND  2,704,014
PHOTO-COMPOSING MACHINE WITH LINE REPEAT MECHANISM
Filed June 21, 1952  7 Sheets-Sheet 1

INVENTOR.
HERMAN R. FREUND
ATTORNEYS

March 15, 1955 H. R. FREUND 2,704,014
PHOTO-COMPOSING MACHINE WITH LINE REPEAT MECHANISM
Filed June 21, 1952 7 Sheets-Sheet 3

INVENTOR.
HERMAN R. FREUND
BY
Curtis, Morris & Safford
ATTORNEYS

INVENTOR.
HERMAN R. FREUND

March 15, 1955  H. R. FREUND  2,704,014
PHOTO-COMPOSING MACHINE WITH LINE REPEAT MECHANISM
Filed June 21, 1952  7 Sheets-Sheet 5

Fig.10.

INVENTOR
HERMAN R. FREUND
BY
Curtis, Morris & Safford
ATTORNEYS

March 15, 1955 H. R. FREUND 2,704,014
PHOTO-COMPOSING MACHINE WITH LINE REPEAT MECHANISM
Filed June 21, 1952 7 Sheets-Sheet 7

Fig. 13

Inventor
HERMAN R. FREUND
By Curtis, Morris + Safford
Attorneys

United States Patent Office 2,704,014
Patented Mar. 15, 1955

2,704,014

PHOTO-COMPOSING MACHINE WITH LINE REPEAT MECHANISM

Herman R. Freund, Brooklyn, N. Y., assignor to Intertype Corporation, Brooklyn, N. Y., a corporation of New York Application June 21, 1952, Serial No. 294,785

13 Claims. (Cl. 95—4.5)

This invention relates generally to typographical machines for photographically producing, on a sensitized film or paper, lines of type matter from composed lines of individual character-bearing elements or matrices. The film when developed may be used, for example, in preparing printing plates that are particularly suited for use in the offset and gravure printing processes. The present invention is particularly concerned with a modification of and improvement in machines of this general type to facilitate re-photographing of a composed line of matrices as many times as may be desired. The apparatus of the present invention is particularly useful when incorporated in a photo-composing machine of the type disclosed and claimed in my copending application Serial No. 237,696, filed July 20, 1951, now Patent No. 2,672,795, of March 23, 1954, and will be illustratively described in connection with such a machine although as the description proceeds it will become apparent that the apparatus can be incorporated with advantage in other types of photo-composing machines as well.

In my copending application Serial No. 237,696 a photo-composing machine is disclosed that is unusually compact and sufficiently portable that it can be readily mounted on an ordinary business type desk. It is especially useful for certain special printing work wherein direct hand composition as distinguished from keyboard composition is either preferable or necessary. For example, many of the Oriental and Middle Eastern languages have alphabets composed of a very large number of individual characters, outstanding examples of such languages being Chinese and Japanese. In such cases keyboard composition is impractical and hand composition must be used. Along the same line the composition of mathematical and other scientific subject matter frequently requires the use of a large number of specialized characters and the machine of my copending application is especially useful for this type of work as well. Other uses for this type of machine include advertising composition where relatively small amounts of text are to be used in conjunction with illustrations and a variety of special printing jobs such as greeting cards, match books, labels and "stripping material," i. e., lines of text or single words to be applied to maps and the like.

The machine of the present invention is useful for all of the foregoing purposes and is also particularly adapted for line-repeat operations. For example, in my copending application Serial No. 209,570, filed February 6, 1951, there is disclosed a method of making various business forms such as ruled forms and in the preparation of such forms it becomes desirable to re-photograph the characters of a given composed line of elements many times. The present machine is well suited to this kind of operation. Also in certain cases it is desirable to repeat a line a number of times with only one or two characters being changed. For example, in the printing of books the first line on each page may comprise the title of the book and the page number and hence the top lines on successive pages differ only in digits representing the page number. The present machine facilitates the production of this kind of type matter.

It is accordingly an object of the present invention to provide a photo-composing machine of the type indicated above particularly adapted for line repeat operations. It is another object of the invention to provide a machine of this type that facilitates the production of repeat lines with minor changes in the composition of the successive lines. It is still another object of the invention to provide a machine capable of either line-repeat operation or of intermittent operation such as that described in my application Serial No. 237,696 and which can be readily converted from one kind of operation to the other. Other objects of the invention will be in part obvious and in part pointed out hereafter.

The many objects and advantages of the present invention can best be understood and appreciated by reference to the accompanying drawings which illustrate a photo-composing machine incorporating a preferred embodiment of the present invention and wherein.

The machine of the present application is in many of its details similar to the machine disclosed in Freund et al. Patent 2,552,882 and substantially the same as the machine described in my copending application Serial No. 237,696 referred to above. It does not appear that any useful purpose would be served by repeating herein the rather lengthy description of these details, and accordingly frequent reference will be made in the following description to Patent 2,552,882 and also to application Serial No. 237,696.

Figures 1, 2, 3:
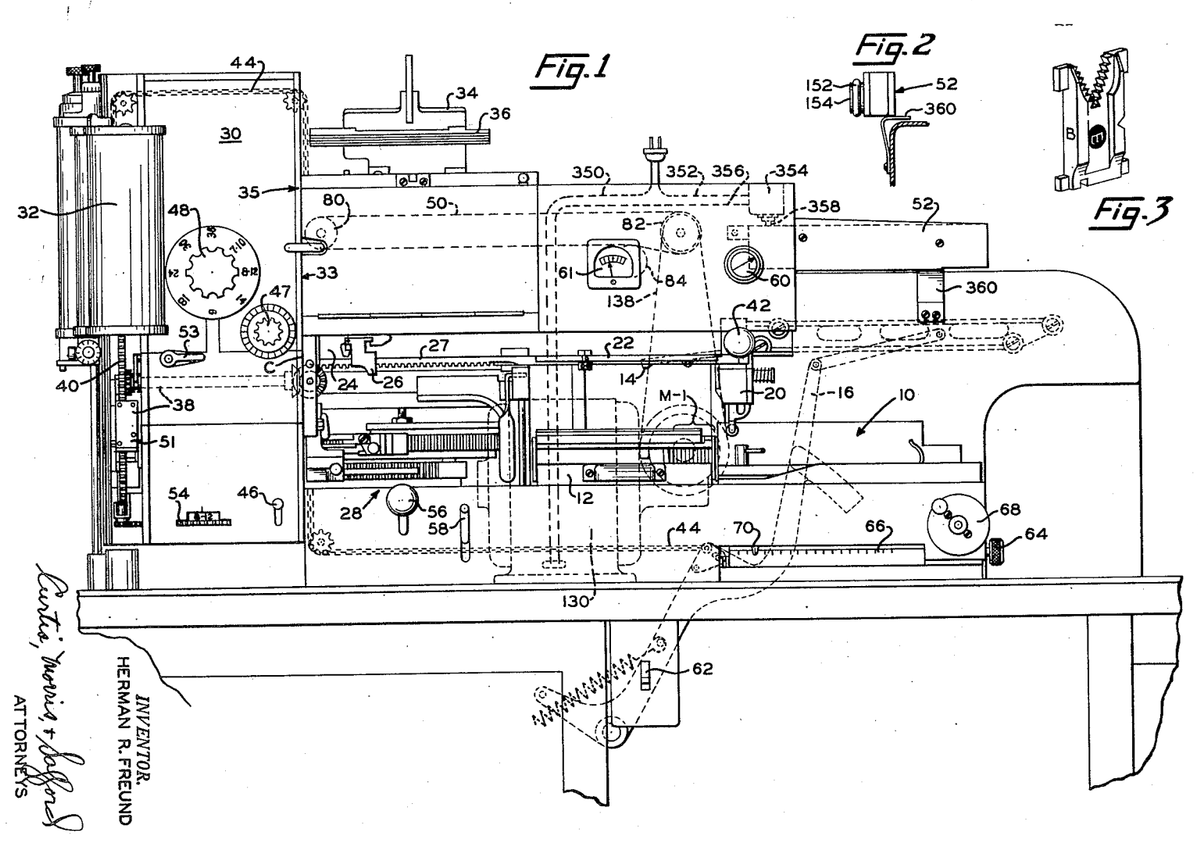
Figure 1 is a general front elevation of the machine.
Figure 2 is an end view of the matrix-return chute, showing the upper latch therefor.
Figure 3 is a perspective view of one of the matrices.

Composition of the desired type matter with the present machine is effected by assembling character-bearing matrices, such as that illustrated in Figure 3, into a line of desired length and then individually photographing on a sensitized surface the characters of successive matrices of the composed line to produce a line of type matter on the sensitized surface. Matrices of the type shown in Figure 3 have been described in Patent 2,552,882 and elsewhere and hence need not be described in detail herein. Such matrices have a thickness that is proportioned to the set-wise width of the characters they bear, and hence the matrix thickness can be used to regulate film movement to secure proper spacing of the characters in a line of type matter.

Brief description of machine

The operation of the machine will first be generally described with reference to Figure 1 of the drawings, and thereafter portions of the machine will be described in detail. Referring particularly to the right-hand portion of Figure 1, in using the present machine a line of matrices M-1 is hand composed in a composing stick 10 which is capable of being removed from the machine and inserted therein in the manner described in my copending application Serial No. 237,696. The composed line of matrices M-1 is manually shifted to the left into an elevator 12 which is manually raised to an upper position at which it trips a line-follower release lever 14. As described in Patent 2,552,882, tripping of the lever 14 releases a line-delivery lever 16 which is urged to the left by a spring (not shown) and is connected to a line-follower 20 that pushes the composed line of matrices from the elevator along a feed channel or track 22 to a justification station 24. As the line-follower 20 reaches the justification station 24, it engages and is latched to a line-length determining member 26 carried on a feed rack 27.

At the justification station 24, line-measuring and justification control mechanism generally designated 28 is provided which is similar to the mechanism disclosed in my copending application Serial No. 177,145, filed August 2, 1950, now Patent No. 2,645,168, of July 14, 1953, and substantially the same as that disclosed in my copending application Serial No. 237,696, referred to above. At the justification station 24, the mechanism 28 co-operates with parts of line-follower 20 to measure the difference between the actual length of the composed line of matrices and the desired line-length to determine what will hereafter be referred to as the line shortage, and modifies movement of the film in such manner that this difference or shortage is distributed over the line of type matter produced on the film or over a pre-selected portion thereof, all as described in my copending application Serial No. 177,145. As an incident of the line-shortage measuring operation, the composed line of matrices at station 24 is urged to the left against an end wall C that forms part of the camera housing.

When the justification measurement has been completed the characters on the matrices are individually photographed by a camera mechanism generally designated 30 that includes a vertically movable film holder 32. As described in Patent 2,552,882, the camera mechanism includes a pair of endless conveyors which pick up the matrices, one at a time, and carry them from the justifying station 24 upward to a photographing station 33, whereat the character on the matrix is photographed, and then to a discharging station 35. As each matrix is removed for photographing, the line-delivery lever 16 and line-follower 20 urge the line to the left to cause the next matrix to bear against wall C.

The feed rack 27 as described in Patent 2,552,882 is connected by a gear and shaft assembly 38 with a vertical rack 40 on which the film holder 32 normally rests. Also the feed rack 27 is connected through member 26 with the line-follower 20 and hence as elements are withdrawn from the line for photographing the rack moves leftward in a stepwise fashion, thus causing the film holder 32 to move downward in a stepwise manner as each element is photographed. The amount of downward movement comprising each step of the film holder depends upon the setwise width of the character being photographed and also upon the line-shortage referred to above. As explained in my application Serial No. 177,145, now Patent No. 2,645,168, issued July 14, 1953, in certain cases, as for example where tabular matter is being composed, it is desirable that no justifying correction be applied to the tabular matter, and hence during photographing of such tabular matter each step movement of the film holder 32 is proportioned only to the width of the character being photographed.

The machine of the present application, like that of application Serial No. 237,696, is provided at the top central portion thereof with an accumulator bar plate 34 to which is fixed an accumulator bar 36. Plate 34 is pivotable about a horizontal axis from an upper position as shown in Figure 1 to a lower position at which the accumulator bar 36 is aligned with the matrix discharge station 35. Thus each element after it is photographed passes to the discharge station 35 and to the accumulator bar 36, from which a line of elements can be removed for redistribution to a magazine or disposal in some other suitable manner. It should be noted that the matrices accumulate on bar 36 in reverse order with respect to their original arrangement, and hence the line of matrices that accumulates on bar 36 cannot be directly re-inserted in the machine to repeat a line. However with the mechanism of the present invention the matrices are automatically re-assembled in the order in which they were originally composed, and at a point where they can be readily fed to the machine for re-photographing.

To accomplish this objective, apparatus is provided for returning the matrices, one at a time, from discharge station 35 to elevator 12. For this purpose a horizontal matrix-return conveyor 50 is provided that extends from a point near the discharge station 35 to a point substantially above the right-hand end of elevator 12. Near the right-hand end of the conveyor 50 there is a matrix-return chute 52 that is pivotally mounted at its left end for swinging movement from an inactive horizontal position as shown in Figure 1 to a vertical position wherein its lower end is close to the elevator 12. When the chute is in this vertical position it can receive matrices from the end of the conveyor 50 and guide them downwardly into elevator 12 in the proper order for re-photographing. When the line of matrices has been re-assembled in elevator 12, the elevator is again raised manually and the operations previously described are repeated.

As described in my copending application Serial No. 237,696, upon completion of the photographing of a line of matrices the machine is re-set to photograph the next line. The line-follower 20 is manually retracted to the right by means of a knob 42 secured thereto. This retraction of line-follower 20 moves delivery lever 16 to the right, i. e., to its position as shown in Figure 1, and also through the medium of a chain 44 raises the film holder 32 to its upper position. Feed rack 27 is also retracted, thus raising rack 40 to its upper position to support film holder 32 during the next photographing operation. The film is then advanced one line space within the film holder 32 by depressing a lever 46 located at the lower left portion of the machine in condition for photographing the characters of another line of elements or for re-photographing a recirculated line of elements.

The machine as shown in Figure 1 includes various adjusting members for adjusting the machine in various respects. The manner in which these adjusting members operate is essentially disclosed either in Patent No. 2,552,882, or in application Serial No. 237,696. Beginning near the left-hand side of Figure 1, these adjusting members include a line-space setting dial 47 whereby the amount of film movement per line may be adjusted; a lens-adjusting dial 48 whereby the degree of magnification of the characters of the character-bearing elements can be varied; a gear box 51 which is exchangeable with other gear boxes to vary the relationship between movement of the feed rack 27 and movement of the film holder 32; a release lever 53 which is movable to release gear box 51 from its gear and shaft assembly 38; a knurled disk 54 whereby the initial position of film holder 32 may be adjusted to provide for accurate alignment of the left margin of the column of type matter with different degrees of magnification; the lever 46 referred to above; a vertically shiftable lever 56 for operating the line-measuring and justification control mechanism 28; a margin-control lever 58 to provide for aligning a short line of type matter at either the left or right margin as desired; a main switch 62 near the bottom of the machine controlling the power supply to the motor that drives the photographing mechanism and also the energy supply to the light source for the camera, a rheostat knob 60 and associated ammeter 61 for adjusting and indicating respectively the magnitude of the current supplied to the light source; a knob 64 for rotating a drum scale 66 having various point-size scales thereon; and a hand wheel 68 which when rotated sets an index 70 relative to the scale 66 to indicate the point size of the desired line, and also sets the line-length determining member 26 to the proper position on feed rack 27.

Matrix-return mechanism

Figure 4:
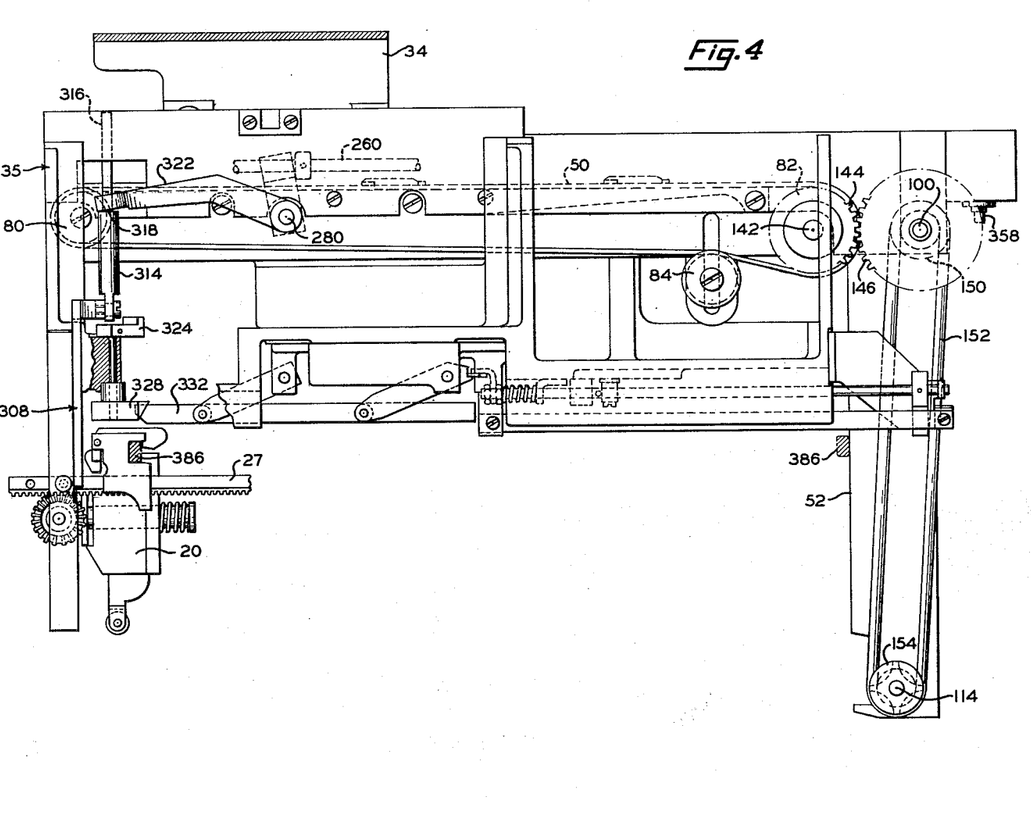
Figure 4 is a front view of the central portion of the machine as shown in Fig. 1 but with portions of the front of the machine removed to show the matrix recirculating mechanism.

As indicated above, the present machine includes apparatus for returning the matrices from the discharge station 35 to the elevator 12 in proper sequence for re-photographing to repeat a line. Referring to Figure 4 of the drawings, the conveyor 50 in the form of an endless belt is mounted for rotation on a pair of spaced pulleys 80 and 82, the pulley 80 being located close to the discharge station 35 and the pulley 82 being located approximately above the right-hand end of the elevator 12. The belt is maintained tight on the pulleys 80 and 82 by a conventional belt tightening device 84.

Figure 8:
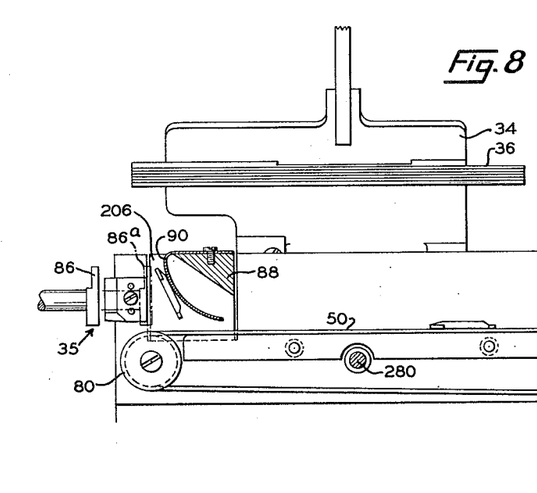
Figure 8 is a vertical section taken on the line 8—8 of Figure 7 and further showing the matrix-return conveyor and guide block.

Referring now to Figure 8 of the drawing, the matrices are discharged from the discharge station by a pusher element 86, the operation of which is described in Patent 2,552,882. The advanced position of pusher, element 86 is indicated in dotted lines and designated by the numeral 86a. Located above the conveyor 50 near the discharge station 35, is a guide block 88 having a curved deflecting member 90 that guides or deflects each matrix into the desired horizontal position on the conveyor 50. As indicated in Figure 8, the deflector member 90 operates to cause the bottom of each matrix to become the leading edge of the matrix on the conveyor 50.

Figure 10:
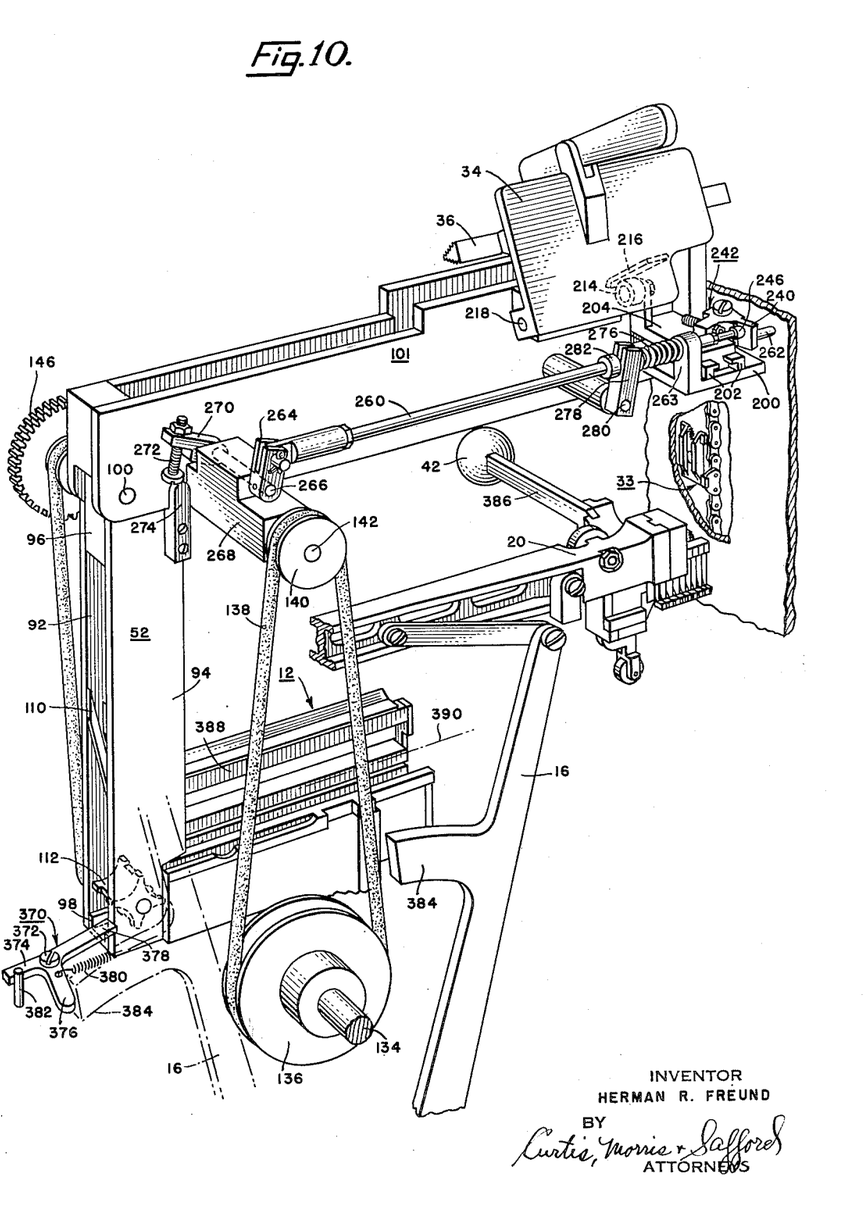
Figure 10 is a rear perspective view of the central portion of the machine showing the motor for operating the matrix-return conveyor and portions of the mechanism whereby the matrix-return chute initiates operation of the camera mechanism and also unlocks the feed rack.
Figures 11, 12:
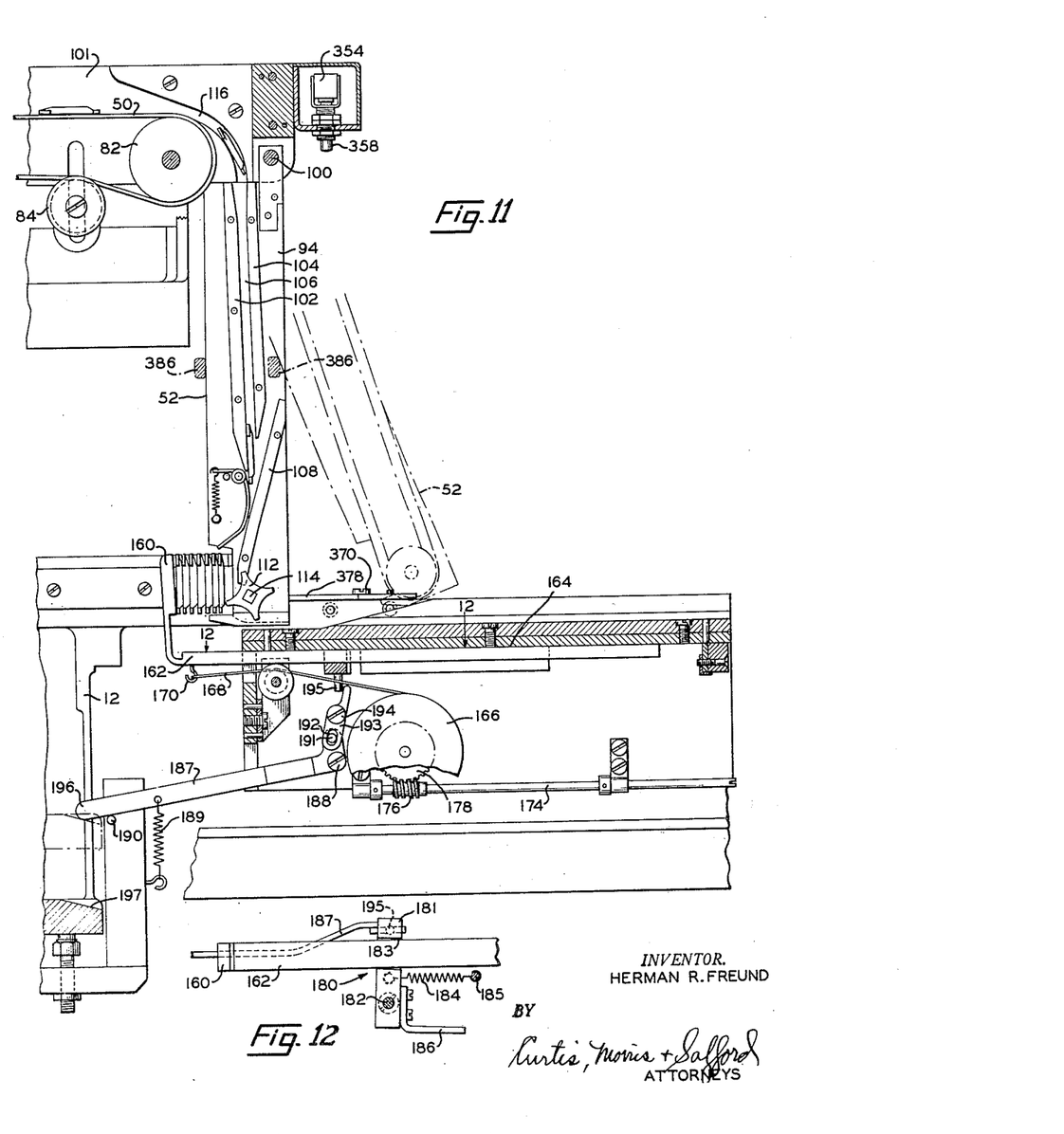
Figure 11 is a vertical section taken essentially on the line 11—11 of Figure 5 and showing the interior of the matrix-return chute as well as the assembler slide and certain associated mechanism.
Figure 12 is a horizontal section taken on line 12—12 of Figure 11 and showing details of the assembler slide brake and, Figure 13 is a perspective view of the feed rack lock and its actuating mechanism.

As previously indicated, a pivoted matrix-return chute 52, is provided at the discharge end of conveyor 50 to guide the matrices to the elevator 12. Referring to Figures 10 and 11, the chute 52 comprises a pair of spaced sides 92 and 94 connected near the upper end of the chute by a cross-piece 96 and at the lower end of the chute by the cross-piece 98. The chute is pivotally mounted on a shaft 100 which is in turn supported in a channel 101 forming part of the frame of the machine, and is adapted to be rotated around the shaft 100 from the horizontal position shown in Figure 1 to the vertical position shown in Figures 10 and 11.

Referring particularly to Figure 11, secured to the side 94 of chute 52 are a pair of spaced guide members 102 and 104 that define a guide groove 106. The other side 92 of the chute 52 is provided with a similar guide groove (not shown). Below the lower end of guide groove 106 is a deflector member 108 positioned at such an angle as to guide the matrices toward the elevator 12. A similar deflector member 110 (see Fig. 10) is secured to the side 92 of the chute 52. At the bottom or discharge end of chute 52 there is a star wheel 112 mounted on a shaft 114, that is rotated by means described hereafter, to insure proper positioning of the matrices in the elevator.

Still referring to Figure 11, matrices are carried by the conveyor 50 to a guide passage 116 formed in the channel 101 and are guided to the upper end of guide groove 106 and the corresponding groove on the side 92 of chute 52. They then drop down through the chute and pass between deflector members 108 and 110 and a spring-biased bail 118 to the star wheel 112 that flips each matrix into the elevator 12.

Figure 5:
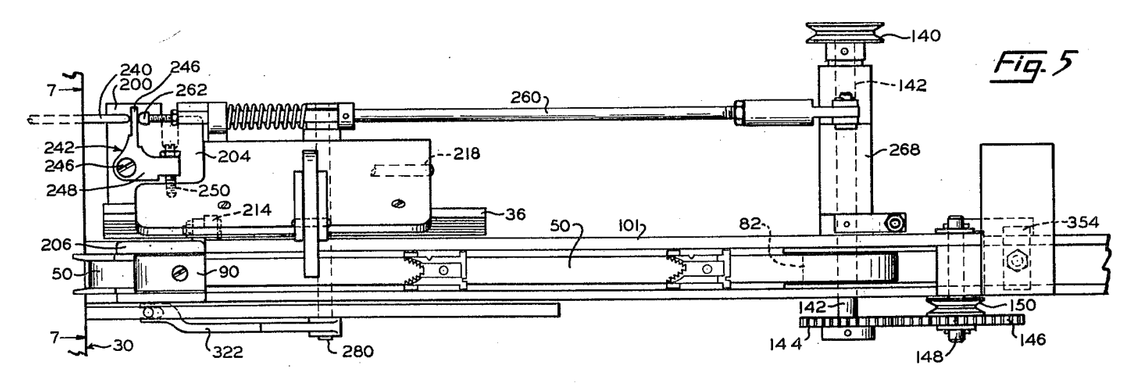
Figure 5 is a top plan view of the central portion of the machine with the assembler bar plate in its raised position and showing the mechanism whereby downward movement of the matrix-return chute initiates operation of the camera mechanism.

The conveyor 50 is driven through pulley 82 and the star wheel 112 through shaft 114 by driving means that will now be described: Power to operate the conveyor is supplied from an electric motor 130, shown in dotted lines near the bottom of Fig. 1. Referring to the bottom portion of Figure 10, the motor is connected through reduction gearing to a shaft 134 to which a pulley 136 is secured. The pulley 136, through a belt 138 and pulley 140, drives a shaft 142 mounted for rotation on a fixed block 268 secured to the channel 101. Referring to Figure 5, the shaft 142 extends through pulley 82 and is fixed thereto, so that rotation of shaft 142 drives pulley 82 and conveyor 50. Also fixed to shaft 142 near the front end thereof is a gear 144 that meshes with a gear 146 secured to a shaft 148 mounted for rotation in 101. Fixed to shaft 148 is a pulley 150 which (see Fig. 4) is connected by a belt 152 to second pulley 154 at the discharge end of chute 52. The pulley 154 is secured to shaft 114 on which the star wheel 112 is mounted and thus the star wheel is driven through pulley 150, belt 152, pulley 154 and shaft 114.

Still referring to Figure 11, the matrices fed into elevator 12 by star wheel 112 are assembled against a line-resistant finger 160 that forms part of an assembler slide 162 is urged toward the right by a spiral spring device 166 similar to those used on typewriters. The free end 168 of spring device 166 is connected to a hook 170 secured to the lower left hand end of the assembler slide 162 and passes over an idler roller 172 mounted between hook 170 and the spring device 166. Tension of the spring within the device 166 can be adjusted by rotation of a shaft 174 carrying a worm 176 that meshes with a gear 178 within the device 166.

Referring particularly to Figure 12 and also to Figure 11, the assembler slide 162 is provided with a brake generally designated 180 and comprising a brake arm 181 mounted for pivoting movement about a pin 182. The slide 162 passes through an opening 183 in the arm 181 and the opening, 183 is slightly wider than the slide. The brake arm 181 is urged clockwise by a spring 184 that is connected to the arm and to a fixed pin 185. The construction is such that slide 162 can be readily moved to the left, but is held against movement to the right by the frictional forces exerted thereon by the left front and right rear portions of the side walls of opening 183.

The brake 180 can be released either manually or automatically. Extending laterally near the front end of 181 there is a tab 186 that can be manually depressed to rotate arm 181 a small amount counterclockwise, thereby permitting spring 166 to retract slide 162. Referring to the lower portion of Figure 11, for automatic release of brake 180 there is a lever 187 pivotally mounted at 188 and urged by a spring 189 against a step 190. The lever 187 is provided at its right end with a pin 191 that engages a slot 192 of a rocker arm 193 pivoted at 194. The upper end of rocker arm 193 is so positioned that when lever 187 is raised the end of arm 193 engages a pin 195 fixed to the rear of brake arm 181 and rotates brake arm 181 counter-clockwise to permit spring 166 to retract slide 162.

The lever 187 is raised by the upward movement of elevator 12. The left end 196 of lever 187 is positioned above a lever-actuating surface 197 of elevator 12, which engages the end 196 of lever 187 as the elevator 12 is lifted. The end 196 of lever 187 is spaced sufficiently far above actuating surface 197 to permit the line of matrices to clear the top of line-resistant finger 160 before the slide 162 is released.

Figure 7:
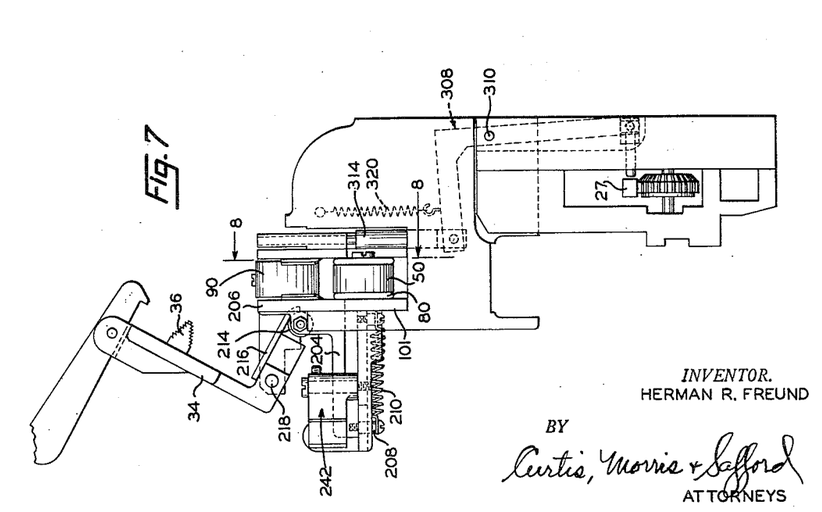
Figure 7 is a vertical section taken on the line 7—7 of Figure 5 showing one end of the matrix-return conveyor, the guide block for guiding matrices on to the conveyor, and the interconnection between the guide block and assembler bar plate, as well as portions of the feed rack lock actuating mechanism.
Figure 9:
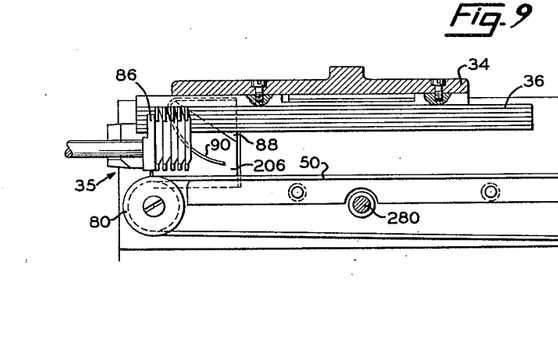
Figure 9 is a view similar to Figure 8 with the assembler bar plate in its lower position.

As indicated at the beginning of the present specification, the present machine is adapted for either the type of operation disclosed in application Serial No. 237,696, wherein the matrices after photographing are collected on assembler bar 36, or for line-repeat operation. Referring now to Figures 7, 8 and 9, the plate 34 is adapted to be lowered to a horizontal position (see Fig. 9) in which position the bar 36 is aligned with the discharge station 35 of the machine and the matrices are collected on the assembler bar from which they can be subsequently removed in any suitable manner such as by means of the hand-composing device 10 shown in Figure 1. When the plate 34 is lowered the guide block 88 is retracted out of the path of the matrices to provide a space for the bar 36 to be moved in to the path of the matrices, and the structure for retracting the guide block will now be described.

Referring to the upper right-hand portion of Figure 10, secured to the frame of the machine is a fixed supporting plate 200 provided with guide members 202 for guiding a slidable block 204 that is slidably mounted on the plate 200. Reverting to Figure 7, the slidable block 204 has a vertical wall 206 to which the guide block 88 is secured. Threaded into the left-hand end of block 204 there is a pin 208 connected by a spring 210 to the channel 101 of the frame of the machine in such manner that the block 204 is urged to the right as viewed in Figure 7 to position guide block 88 above the matrix-return conveyor 50.

Figure 6:
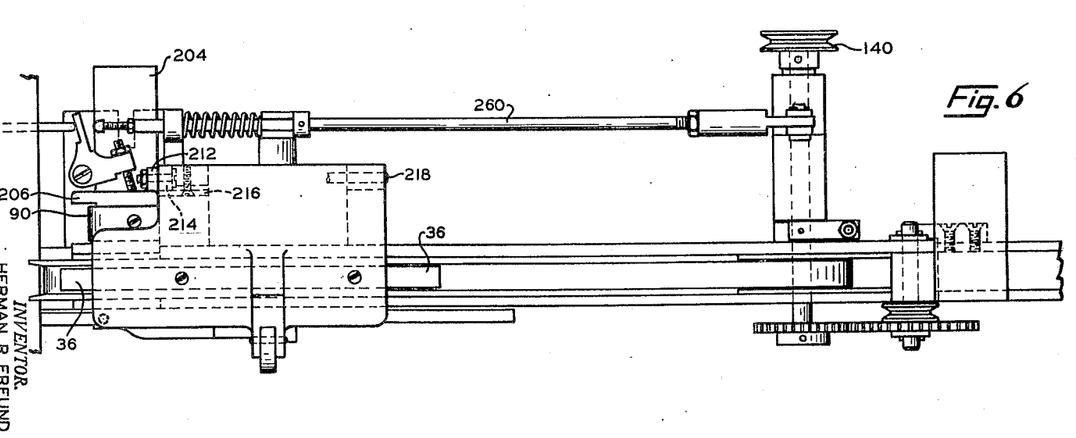
Figure 6 is a view similar to Figure 5 but with the assembler bar plate in closed position.

Referring now also to Figures 5 and 6, formed on the block 204 near the wall 206 there is a post 212 on which a small roller 214 is mounted. (See also Fig. 10.) The roller 214 (see Fig. 7) is engaged by a bar 216 fixed to the accumulator bar plate 34. The roller 214 is appreciably spaced from the pivot 218 of the accumulator plate 84 and thus as the plate 34 is moved to its horizontal position, the bar 216 and roller 214 cooperate to retract the slidable block 204 against the tension of spring 210 and thereby retract guide block 88 from the path of the discharged matrices. Thus when the accumulator bar plate 34 is in its lower position; (as in Fig. 9) the bar 36 is positioned to receive the matrices, whereas when the plate 34 is in its upper position (as in Fig. 8) the guide block 88 is in position to deflect the matrices downwardly on to the conveyor 50.

*Camera starting and feed rack release mechanism*

As described in Patent 2,552,882, the camera mechanism includes various operating parts that are driven by an electric motor through a clutch. After the composed line of matrices has been moved to the justification station 24 and the line-measuring and justification control operations have been completed, the camera clutch is engaged to cause the matrices to be moved successively to the photographing station 33 (see Figs. 1 and 10). Referring to Figure 5 of the drawings, and particularly the left-hand side thereof, engagement of the camera clutch is effected by moving a pin 240 to the left. In order to effect this leftward movement of pin 240, a bellcrank 242 is mounted by means of a screw 244 on the plate 200. The bellcrank 242 comprises an arm 246 positioned to engage the pin 240 and an arm 248 through which is threaded a screw or pin 250 positioned to be engaged by the wall 206 of slidable block 204. Thus as the accumulator bar plate 34 is lowered and block 204 retracted, the bellcrank 242 is rotated to move pin 240 to the left and thereby start the camera mechanism operating.

During line-repeat operation the accumulator bar plate 34 remains in its upper position and hence a separate mechanism is provided for starting the operation of the camera under these circumstances. When the machine is arranged for line-repeat operation, the starting of the camera is effected by the swinging movement of the matrix-return chute 52 to its lower position. Still referring to Figures 5 and 6 of the drawings, the bellcrank 42 can be rotated not only by the retraction of block 204 but also by means of a rod 260 having a head 262 at its lefthand end positioned to engage the arm 246 of bellcrank 242.

Referring now to Figure 10 of the drawings, rod 260 is mounted for sliding movement near its right hand end in a post 263 extending upwardly from the plate 200. The left-hand end of rod 260 is secured to a rocker arm 264 mounted on a shaft 266 that is mounted for rocking movement in block 268. Also fixed to the shaft 266 there is a rocker arm 270 having contact pin 272 at its outer end. The chute 52 is provided with a lug 274 positioned to engage the contact pin 272 as the chute approaches its vertical position. Thus as the lower end of chute 52 approaches elevator 12 the lug 274 rocks the shaft 266 to cause rod 260 to move to the right and thereby rotate bellcrank 242 to urge pin 240 to the right to start the camera mechanism.

Still referring to Figure 10, the rod 260 is urged to the left by a spring 276 surrounding the rod 260 and interposed between post 262 and the upper end of a lever arm 278 that is fixed to a shaft 280. A collar 282 is secured to rod 260 to maintain spring 276 under compression. It is apparent that as the lug 274 of chute 52 causes the rod 260 to move to the right shaft 280 will be rotated in a clockwise direction at the same time that the camera starting pin 240 is actuated. Rotation of shaft 280 operates through mechanism now to be described to release the feed rack 27 at substantially the same time that the camera is started.

Figure 13:
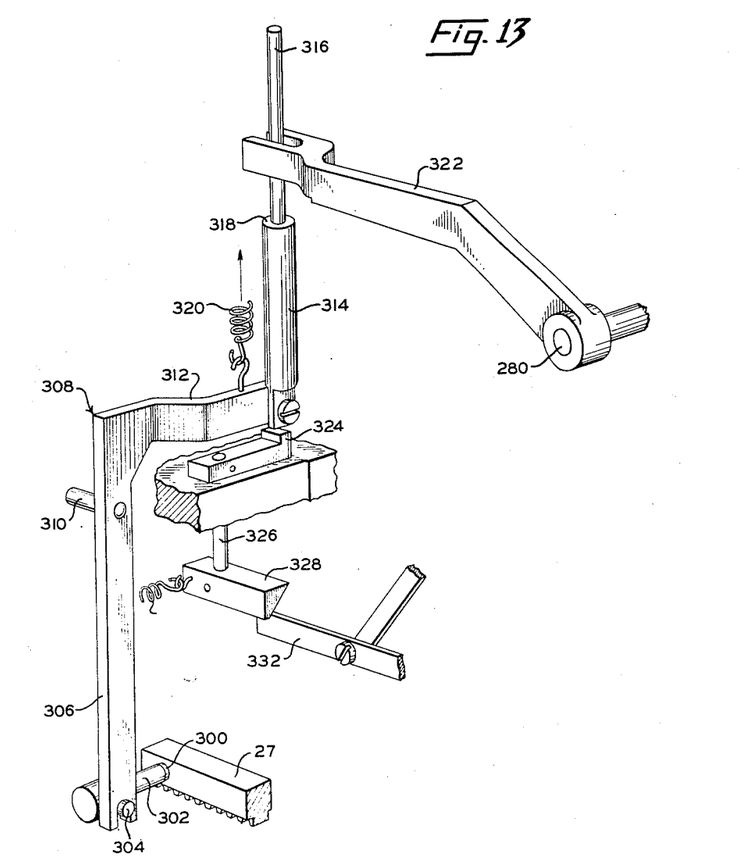

Referring to Figure 13 of the drawings and also to Figures 4 and 7, the feed rack 27 is provided with a hole 300 that is adapted to be engaged by an axially movable locking bolt 302. The bolt 302 has a laterally extending pin 304 embraced by the lower forked end of one arm 306 of a bellcrank lever 308 mounted for rotation about a pivot 310. The other arm 312 of bellcrank 308 is pivotally connected to the lower end of a rod 314 which is provided at its upper end with an extension 316 of reduced diameter that cooperates with the main part of rod 314 to define an annular shelf 318. Interconnecting the arm 312 of bellcrank 308 and the frame of the machine, there is a spring 320 that is normally under tension and tends to urge the locking bolt 302 into the hole 300 of feed rack 27. Positioned to engage the shelf 318 of rod 314, there is a lever 322 that is secured to the front end of shaft 280 which was previously referred to in connection with Figure 10 of the drawings. As shown in Figure 13, the left hand end of lever 322 is forked and embraces the extension 316 of rod 314.

In order to prevent inadvertent release of the feed rack 27 mechanism is provided for preventing withdrawal of the locking bolt 302 until after the composed line has been moved to the justification station 24. Still referring to Figure 13, located near the bottom of rod 314 there is an interponent 324 that is positionable under the bottom of rod 314 to prevent lowering of the rod and withdrawal of locking bolt 302, and also is swingable about a pivot 326 to a position where rod 314 can be lowered to withdraw the locking bolt 302. Secured to the lower end of pivot shaft 326 is a wedge member 328 to which is connected a spring 330 biased to urge interponent 324 under rod 314. Clockwise movement of pivot shaft 326 to move interponent 324 out from under rod 314 is effected by a bar 332 that is swingable to the left to rotate wedge 328, all as described in my copending application Serial No. 237,696. Swinging of bar 332 is produced by engagement of a portion of the line-follower 20 with the bar as the line-follower approaches the justification station. As previously pointed out, movement of the matrix-return chute 52 to its lower position causes the shaft 280 to be rotated and this rotation of shaft 280 causes lever 322 to engage shelf 318 and depress rod 314, thereby causing locking bolt 302 to be withdrawn from the feed rack. Thus as the matrix-return chute 52 reaches its lower position the camera mechanism is started and at substantially the same time the feed rack 27 is unlocked.

When the machine is so used as to collect matrices on the bar 36, the matrix-return chute 52 remains in its horizontal position. Under these circumstances the feed rack is unlocked in the same manner as described in my copending application Serial No. 237,696, that is, the upper end of extension 316 of rod 314 is depressed by the accumulator bar plate 34 as the plate is moved to its lower position. Thus lowering of the accumulator bar plate 34 starts the camera mechanism and at substantially the same time unlocks the feed rack 27.

*Controls and auxiliary devices*

Reverting to Figure 1, the conveyor 50 and the star wheel 112 of return chute 52 are driven by a motor 130, as previously described. The motor 130 is supplied with power from a suitable source by a circuit that includes a conductor 350 directly connected to the motor and a conductor 352 that is connected to a micro-switch 354 which is in turn connected by a conductor 356 to the motor. The micro-switch 354 (also shown in Fig. 11) is provided with a contact button 358 adapted to be engaged by the return chute 52 when it is in its horizontal position. The electrical connections are such that when the chute 52 is horizontal the power supply circuit to motor 130 is broken and when the chute 52 is swung downwardly it moves away from contact button 358 to cause the power supply circuit to be closed and start motor 130 in operation, thereby starting the conveyor 50 and the star wheel 112.

For maintaining the chute 52 in horizontal position, a latch is provided. Referring particularly to Figure 2 of the drawings a latch 360 comprising a curved spring member is secured at its lower end to the frame of the machine and bears against the under side of chute 52. To release the chute for downward swinging movement, the latch 360 is manually depressed i. e. pressed to the right as viewed in Fig. 2.

Referring to the lower left portion of Figure 10, a latch 370 is provided for latching the chute 52 in its lower position. The latch 370 comprises a bell-crank mounted for rotation about a fixed pivot 372 and having the arms 374, 376 and 378. The arm 376 is connected by a spring 380 to the frame of the machine and the bell-crank is urged counter-clockwise around pivot 372 by this spring. Counter-clockwise movement of the bell-crank is limited by a stop 382 positioned to engage arm 374 of the bell-crank. As the chute 52 approaches its lower position, the arm 378 of the bell-crank is moved behind the chute by the action of spring 380 until arm 374 strikes stop 382 and in this way the chute is latched with its discharge end adjacent to elevator 12.

The latch 370 is released by return movement of the line-delivery lever 16. The line-delivery lever is provided with a curved arm 384 positioned to engage arm 376 as the lever 16 approaches its retracted position, thereby moving arm 378 out from behind chute 52, and unlatching the chute.

Still referring to Figure 10, the line-delivery lever 16 and line-follower 20 can be manually retracted by means of a spherical knob 42 that is mounted on the front end of a bar 386 secured to the line-follower 20. The bar 386 is so positioned as to engage the chute 52 as the line-follower 20 is retracted. The arrangement of the parts is such that as the delivery lever and line-follower approach their retracted position arm 384 of the delivery lever unlatches chute 52 and thereafter bar 386 engages the chute and swings it a short distance away from elevator 12, the swung out position of the chute being indicated in dash lines in Figure 11. With this arrangement the chute 52 cannot be re-latched to start the camera mechanism until the elevator 12 has again been raised to release the line-delivery lever and line-follower to move a line of matrices to justification station 24.

Still referring to Figure 10, the elevator 12 is provided with a gate section 388 that can be pivoted forwardly about an axis 390 to give access to a line of matrices in the elevator. Gate 388 is useful during line-repeat operation in cases where it is desired to change one or two matrices and then repeat a line.

Operation

The operation of the machine should be largely apparent from the foregoing description but it seems desirable to summarize briefly herein the various steps of the operation of the machine in the order in which they occur. The machine is initially adjusted for the point-size of the type matter to be produced and the line-length that is desired. It is apparent that the order in which these initial adjustments are made is not critical. Referring to Figure 1, these adjustments are as follows:

(a) Set the drum scale 66 to bring into co-operative relation with the index 70 a scale having the proper point-size thereon.

(b) Rotate the hand wheel 68 to set the index member 70 to indicate the desired line length on the scale 66. Rotation of this hand wheel, as previously indicated, also positions the line-length determining member 26 to the proper position on feed rack 27.

(c) Adjust lens dial 48 for proper point-size.

(d) Set margin adjusting dial 54 for proper point-size.

(e) Insert the proper gear box 51 in the film holder actuating train.

(f) Set line-space dial 47 to give the proper line-advancing movement of the film.

(g) Adjust the justification mechanism 28 by setting the justification conditioning lever 58 to the proper position. If tabular matter is to be composed, further adjustments of the justification apparatus 28 are required as described in co-pending application Serial No. 237,696. After these adjustments have been completed the starting switch 62 is operated to supply power to the machine.

A line of matrices M-1 is composed in the hand stick 10, and the composing stick is inserted in the machine. Thereafter the composed line is inserted in the elevator as described in application Serial No. 237,696 by moving a sliding member of the hand stick bearing the matrices into the elevator. The elevator 12 is then raised to remove the line of matrices from the slidable member of the hand stick and the hand stick 10 is withdrawn from the machine.

When elevator 12 reaches its upper position it trips the release lever 14, and line-delivery lever 16 and line-follower 20 move the composed line to the justification station 24. The leftward movement of the line-follower 20 swings the bar 332 (see Fig. 13) to the left, thereby rotating wedge 328 and conditioning the feed rack unlocking mechanism for unlocking the feed rack.

When the line-follower 20 reaches the line-determining member 26 it latches therewith and the composed line is then positioned at the justification station 24 between the line-follower 20 and the end wall C. Knob 56 is then depressed to measure the line-shortage and the machine is in condition for photographing of the characters on the matrices. If the matrices after photographing are to be collected on the assembler bar 36 the next step is to lower the accumulator bar plate 34, which operation starts the camera mechanism and also unlocks feed rack 27. Thereafter the photographing operation, which is fully described in Patent 2,552,882, takes place. The matrices are moved upwardly in sequence from justification station 24 to photographing station 33 by feed chains, and then raised to discharge station 35 at which they are discharged on the accumulator bar 36. Film holder 32 moves downward in steps the size of which is controlled by the extent of movement of feed rack 27. The size of each step, as previously pointed out, is determined by two factors, namely, the thickness of the element removed from the head of the line and the justifying correction that is applied.

When the line-length determining member 26 reaches end wall C the line follower 20 is automatically unlatched therefrom. The knob 42 of the line-follower is then grasped and the line-follower returned to its right-hand position. As explained in Patent 2,552,882, the line-follower during its retractive movement repositions the feed rack 27 and the film holder 32. Also, in cases where the matrix-return chute 52 is in its lower position, the retraction of line-follower 20 unlatches the chute and swings it away from the elevator 12.

When the line-follower has been returned to its right-hand position and latched by upward movement of the right end of release lever 14, the accumulator bar plate 34 is raised, thereby disengaging the camera drive clutch and releasing the feed rack locking bolt mechanism to permit the bolt 302 to enter the feed rack hole 300 and lock the feed rack. The raising of plate 34 also permits spring 320 (see Fig. 13) to raise rod 314 and spring 376 then moves the interponent 324 under rod 314, thereby preventing lowering of the plate 24, starting of the camera mechanism and release of feed rack 27 until the line-follower has positioned another line at the justification station. The discharged matrices are removed from the accumulator bar 36 and returned to storage. The knob 46 is then manually depressed to advance the film and the machine is ready for another cycle of operation.

In cases where the machine is to be arranged for line-repeat operation the accumulator bar plate is left in its upper position. The operation is the same as that previously described up through the step of depressing the knob 56 of the justification apparatus 28. Thereafter the latch 360 of matrix-return chute 52 is depressed and the chute is swung downwardly toward the elevator 12. The initial movement of chute 52 causes the switch 354 to be actuated to start the motor 130 that drives the conveyor 50 and the star wheel at the discharge end of the chute. As the lower end of chute 52 approaches elevator 12 the lug 274 of the chute rocks shaft 266 to move rod 260 to start the camera mechanism and also unlock the feed rack 27. Thereafter the chute is latched against elevator 12 by latch 370 and photographing of the characters of the matrices proceeds as before.

The matrices that arrive at the discharge station 35 are pushed by pusher 86 against guide block 88 which guides them onto the conveyor 50, and are then conveyed to the upper end of chute 52. The matrices are then guided in sequence through the chute 52 and flipped by the star wheel back into the elevator 12. Since the matrices are assembled in the elevator in the same order in which they are discharged from the discharge station, they are in proper order for re-photographing. When the matrices have been re-assembled in elevator 12 the line-follower is retracted as previously described to unlatch the chute 52. As particularly indicated in Figure 11, when the line-follower is in its fully retracted position it bears against the chute 52 and maintains it spaced outward from the elevator. If it is desired to repeat the composed line another time, the elevator 12 is lifted to cause the line-follower to again advance the line to the justification station and the operations described above are repeated. Also if only one or a few characters are to be changed in the composed line, the gate 388 of the elevator 12 can be opened and the desired matrix or matrices inserted before the elevator is again raised to repeat the line.

From the foregoing description it is apparent that the present invention provides a structure capable of achieving the several objectives set forth at the beginning of the present specification. It is of course to be understood that the structure described is illustrative only and that numerous changes therein can be made within the scope of the invention as described in the appended claims.

Having described my invention, I claim:

1. In a photo-composing machine of the type wherein a composed line of elements bearing photographable characters is moved laterally from an assembly station to a justification station, and the elements of said line are then individually and successively moved upwardly first to a photographing station for photographing and then to a discharge station; apparatus for returning the elements of said line to said assembly station in proper order for re-photographing comprising, in combination, a substantially horizontally disposed endless conveyor having one end positioned adjacent to said discharge station to receive elements discharged therefrom and having its other end positioned substantially directly above said assembly station, a chute mounted for pivotal movement about an axis near said other end of said conveyor and swingable toward and away from the assembly station, said chute being positioned to receive elements from said conveyor and having a discharge end engageable with said assembly station to deliver said elements in sequence thereto for re-assembly into said composed line.

2. In a photo-composing machine of the type wherein a composed line of elements bearing photographable characters is moved laterally from an assembly station to a justification station, and the elements of said line are then individually and successively moved upwardly first to a photographing station for photographing and then to a discharge station; apparatus for returning the elements of said line to said assembly station in proper order for re-photographing comprising, in combination, an endless conveyor having one end positioned adjacent to said discharge station to receive elements discharged therefrom and having its other end positioned substantially above said assembly station, a guide block positionable above said one end of said conveyor to guide elements discharged from said discharge station into a desired horizontal position on said conveyor, a chute mounted for pivotal movement about an axis near said other end of said conveyor and swingable toward and away from said assembly station, said chute being positioned to receive elements from said conveyor and having a discharge end engageable with said assembly station to deliver said elements in sequence thereto for re-assembly into said composed line, the discharge end of said chute being provided with a rotatable star wheel to insure delivery of said elements in the proper position to said assembly station, an accumulator member movable into alignment with said discharge station and means mechanically interconnecting said accumulator member and guide block, whereby said accumulator member or guide block can be selectively moved into alignment with said discharge station.

3. In a photo-composing machine of the type that includes a line-assembly device adapted to support a composed line of elements bearing photographable characters, a line-follower for moving said line of elements from said assembly device to a justification station, a camera and associated mechanism including a movable film holder containing a sensitized film for photographing the characters of said elements and element-moving means for moving said elements individually and successively from said justification station first to a photographing station and then to a discharge station; apparatus for transferring said elements from said discharge station to said assembly device in proper order for re-photographing comprising, in combination, an endless belt extending from said discharge station to a point substantially above said assembly device, a chute mounted for pivotal movement about an axis near said conveyor and positioned to receive elements therefrom, said chute being swingable from a substantially horizontal inactive position to a substantially vertical position adjacent to said assembly device, said chute having a discharge end engageable with said assembly device for delivery of said elements in sequence thereto for re-assembly into said composed line, motor means for operating said endless belt and a switch for energizing said motor means, said switch being operated to energize said motor means by movement of said chute from its horizontal position toward its vertical position.

4. A photo-composing machine according to claim 3 and wherein a latch is provided for maintaining said chute in horizontal position.

5. In a photo-composing machine of the type that includes a line assembly device adapted to support a composed line of elements bearing photographable characters, a line-follower for moving said line of elements from said assembly device to a justification station, a camera and associated mechanism including a film holder containing a sensitized film for photographing characters of said elements and element-moving means for moving said elements individually and successively from said justification station first to a photographing station and then to a discharge station; apparatus for transferring said elements from said discharge station to said assembly device in proper order for re-photographing comprising, in combination, an endless belt extending from said discharge station to a point substantially above said assembly device, a chute pivotally mounted near said endless belt and swingable toward and away from said assembly device, said chute being positioned to receive elements from said endless belt and having a discharge end movable to an element-delivery position adjacent to said assembly device for delivering said elements in sequence thereto for re-assembly into said composed line and a latch for latching said chute in its element-delivery position, said latch being releasable by retraction of said line-follower from said justification station.

6. In a photo-composing machine of the type that includes a line-assembly device adapted to support a composed line of elements bearing photographable characters, a line-follower for moving said line of elements from said assembly device to a justification station, a camera and associated mechanism including a movable film holder containing a sensitized film for photographing the characters of said elements and element-moving means for moving said elements individually and successively from said justification station first to a photographing station and then to a discharge station, a feed rack movable with said composed line of elements as they are fed to said element-moving means and a locking member engageable with and disengageable from said feed rack to lock and unlock said rack; apparatus for transferring said elements from said discharge station to said assembly device in proper order for re-photographing comprising, in combination, an endless belt extending from said discharge station to a point substantially above said assembly device, a chute pivotally mounted near said endless belt and swingable toward and away from said assembly device, said chute being positioned to receive elements from said endless belt and having a discharge end movable to an element-delivery position adjacent to said assembly device for delivery of said elements in sequence thereto for reassembly into said composed line, and mechanism for initiating movement of said element-moving means and film holder, said chute having a part positioned to actuate said initiating mechanism as the discharge end of said chute approaches said delivery position.

7. In a photo-composing machine of the type that includes a line-assembly device adapted to support a composed line of elements bearing photographable characters, a line-follower for moving said line of elements from said assembly device to a justification station, a camera and associated mechanism including a movable film holder containing a sensitized film for photographing the characters of said elements and element-moving means for moving said elements individually and successively from said justification station first to a photographing station and then to a discharge station, a feed rack movable with said composed line of elements as they are fed to said element-moving means, and a locking member engageable with and disengageable from said feed rack to lock and unlock said rack; apparatus for transferring said elements from said discharge station to said assembly device in proper order for re-photographing comprising, in combination, an endless belt extending from said discharge station to a point substantially above said assembly device, a chute pivotally mounted near said endless belt and swingable toward and away from said assembly device, said chute being positioned to receive elements from said endless belt and having a discharge end movable to an element-delivery position adjacent to said assembly device for delivery of said elements in sequence thereto for re-assembly into said composed line, and a lock-actuating mechanism mechanically connected to said feed rack locking member, said chute having a part positioned to engage said lock-actuating mechanism as the discharge end of said chute reaches said delivery position to cause said lock-actuating mechanism to unlock said rack.

8. In a photo-composing machine of the type that includes an elevator adapted to support a composed line of elements bearing photographable characters, a line-follower for moving said line of elements from said elevator to a justification station, a camera and associated mechanism including a movable film holder containing a sensitized film for photographing the characters of said elements and element-moving means for moving said elements individually and successively from said justification station first to a photographing station and then to a discharge station, a feed rack movable with said line of elements as it is fed to said element-moving means, and a locking member engageable with and disengageable from said feed rack to lock and unlock said rack; apparatus for transferring said elements from said discharge station to said elevator in proper order for re-photographing comprising, in combination, an endless belt extending from said discharge station to a point substantially above said elevator, a chute pivotally mounted near said endless belt and swingable toward and away from said elevator, said chute being positioned to receive elements from said endless belt and having a discharge end movable to an element-delivery position adjacent to said elevator to deliver said elements in sequence thereto for re-assembly into said composed line, a member movable to initiate operation of said film holder and element-moving means, a lock-actuating mechanism for actuating said feed rack locking member and mechanism for conjointly operating said initiating member and said lock-actuating mechanism, said chute having a part engageable with said conjointly operative mechanism as said chute approaches its delivery position to cause said feed rack locking member to be disengaged from said feed rack and to start the operation of said film holder and element-moving means.

9. In a photo-composing machine, in combination, an elevator adapted to support a composed line of elements bearing photographable characters, a line-follower for moving said line of elements from said elevator to a justification station, a camera and associated mechanism including element-moving means for moving said elements individually and successively from said justification station first to a photographing station and then to a discharge station, an accumulator member movable from an inactive position to an accumulating position in alignment with said discharge station to receive elements discharged therefrom, an endless conveyor having one end positioned adjacent to said discharge station to receive elements therefrom and having its other end positioned substantially above said elevator, a chute extending from said other end of said conveyor to said elevator for guiding said elements in sequence to said elevator for re-assembly into said composed line, a guide block positioned above said one end of said conveyor to guide elements discharged from said discharge station into a desired horizontal position on said conveyor, said guide block being retractable out of the path of said elements and said accumulator member being effectively connected to said guide block to retract it as said accumulator member moves to said accumulating position, whereby elements arriving at said discharge station can be collected on said accumulator member or returned to said elevator as desired.

10. In a photo-composing machine of the type that includes an elevator adapted to support a composed line of elements bearing photographable characters, a line-follower for moving said line of elements from said elevator to a justification station, a camera and associated mechanism including a movable film holder containing a sensitized film for photographing the characters of said elements and element-moving means for moving said elements individually and successively from said justification station first to a photographing station and then to a discharge station, an endless conveyor having one end positioned adjacent to said discharge station to receive elements discharged therefrom and having its other end positioned above said assembly station, a chute pivotally mounted near said conveyor and swingable toward and away from said elevator, said chute being positioned to receive elements from said conveyor and having a discharge end movable to an element-delivery position adjacent to said elevator to deliver said elements in sequence thereto for re-assembly into said composed line, an accumulator member movable from an inactive position to an accumulating position in alignment with said discharge station to receive elements discharged therefrom, a member movable to initiate movement of said film holder and element-moving means, a feed rack movable with said line of elements as said element-moving means removes elements from said line, a locking member engageable with and disengageable from said feed rack to lock and unlock said rack, and a lock-actuating mechanism mechanically connected to said locking member, both said initiating member and said lock-actuating device being selectively operable either by movement of said accumulator member to accumulating position or movement of the discharge end of said chute to said element-delivery position, whereby elements arriving at said discharge station can be either collected on said accumulator member or returned to said elevator for re-photographing as desired.

11. In a photo-composing machine, in combination, an elevator adapted to support a composed line of elements bearing photographable characters, a line-follower for moving said line of elements from said elevator to a justification station, a camera and associated mechanism including a movable film holder containing a sensitized film for photographing the characters of said elements and element-moving means for moving said elements individually and successively from said justification station first to a photographing station and then to a discharge station, a member movable to initiate movement of said film holder and said element-moving means, a feed rack movable with said composed line as elements thereof are fed to said element-moving means, a locking member engageable with and disengageable from said feed rack to lock and unlock said rack, a lock-actuating mechanism mechanically connected to said locking member, an endless conveyor having one end positioned adjacent to said discharge station to receive elements discharged therefrom and having its other end positioned substantially above said elevator, a chute pivotally mounted near said conveyor and swingable toward and away from said elevator, said chute being positioned to receive elements from said conveyor and having a discharge end movable to an element-delivery position adjacent to said elevator to deliver said elements in sequence thereto for re-assembly into said composed line, a guide block positioned above one end of said conveyor to guide elements discharged from said discharge station to a desired horizontal position on said conveyor, said guide block being retractable out of the path of elements discharged from said discharge station and said accumulator member being connected to said guide block to retract it as said accumulator member moves to said accumulating position and both said initiating member and said lock-actuating mechanism being actuatable either by movement of said accumulator member to said accumulating position or by movement of the discharge end of said chute to said element-delivery position, whereby elements discharged from said discharge station can be either collected on said accumulator member or returned to said elevator for re-photographing, as desired.

12. In a photo-composing machine of the type that includes an elevator adapted to support a composed line of elements bearing photographable characters, a line-follower for moving said line of elements from said elevator to a justification station, a camera and associated mechanism including a movable film holder containing a sensitized film for photographing the characters of said elements and element-moving means for moving said elements individually and successively from said justification station first to a photographing station and then to a discharge station, said elevator being shiftable from a lower line assembly position to an upper position in alignment with said justification station, apparatus for transferring said elements from said discharge station to said elevator in proper order for re-photographing comprising, in combination, an endless conveyor extending from said discharge station to a point substantially above said elevator, a chute pivotally mounted near said conveyor and swingable toward and away from said elevator, said chute being positioned to receive elements from said conveyor and having a discharge end movable to an element-delivery position adjacent to said elevator to deliver said elements in sequence thereto for re-assembly into said composed line, a line-resistant finger and support therefor movable into said elevator, when said elevator is at its lower position, by said elements as they are delivered from said chute, said finger being spring-biased toward said chute, and a brake operatively associated with said support to prevent undesired return movement of said finger.

13. A photo-composing machine according to claim 12 and including a brake releasing device associated with said brake, said releasing device being positioned to engage said elevator, whereby raising of said elevator to its upper position actuates said releasing device to release said brake and cause said spring to withdraw said finger from said elevator.

References Cited in the file of this patent

UNITED STATES PATENTS

| | | |
|---|---|---|
| 1,761,304 | Langsner | June 3, 1930 |
| 2,560,517 | Freund | July 10, 1951 |